United States Patent
Cherry

(10) Patent No.: US 7,394,358 B2
(45) Date of Patent: Jul. 1, 2008

(54) METHOD AND SYSTEM FOR INVENTORY MONITORING

(75) Inventor: Craig D. Cherry, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 167 days.

(21) Appl. No.: 11/230,365

(22) Filed: Sep. 19, 2005

(65) Prior Publication Data

US 2007/0063817 A1    Mar. 22, 2007

(51) Int. Cl.
*G08B 26/00*    (2006.01)
(52) U.S. Cl. ............ 340/505; 340/572.1; 235/462.46
(58) Field of Classification Search ........... 340/505, 340/572.1, 10.1; 235/462.01, 462.44, 462.45, 235/462.46, 385
See application file for complete search history.

(56) References Cited

U.S. PATENT DOCUMENTS

| | | | | |
|---|---|---|---|---|
| 5,640,002 A * | 6/1997 | Ruppert et al. | ......... | 235/462.46 |
| 5,659,167 A | 8/1997 | Wang et al. | ......... | 235/472 |
| 6,170,748 B1 * | 1/2001 | Hash et al. | ......... | 340/572.1 |
| 6,292,525 B1 | 9/2001 | Tam | ......... | 378/4 |
| 6,318,636 B1 | 11/2001 | Reynolds et al. | ......... | 235/472.01 |
| 6,456,239 B1 * | 9/2002 | Werb et al. | ......... | 342/463 |
| 6,607,134 B1 * | 8/2003 | Bard et al. | ......... | 235/462.46 |
| 6,687,460 B2 | 2/2004 | Muller | ......... | 396/534 |
| 6,745,027 B2 | 6/2004 | Twitchell, Jr. | ......... | 455/422.1 |
| 6,758,403 B1 * | 7/2004 | Keys et al. | ......... | 235/462.46 |
| 6,895,196 B2 | 5/2005 | Uchizono et al. | ......... | 399/75 |
| 7,042,358 B2 * | 5/2006 | Moore | ......... | 340/572.1 |
| 7,063,256 B2 | 6/2006 | Anderson et al. | ......... | 235/385 |
| 7,195,169 B2 * | 3/2007 | Bhatia et al. | ......... | 235/462.46 |
| 7,199,716 B2 * | 4/2007 | Shanks et al. | ......... | 340/572.1 |
| 7,221,668 B2 * | 5/2007 | Twitchell, Jr. | ......... | 370/338 |
| 7,243,849 B2 * | 7/2007 | Lapstun et al. | ......... | 235/462.45 |
| 2001/0008390 A1 | 7/2001 | Berquist et al. | ......... | 340/10.31 |
| 2004/0076232 A1 | 4/2004 | Akiyama et al. | ......... | 375/240.08 |
| 2004/0105024 A1 | 6/2004 | Takahashi | ......... | 348/333.01 |
| 2004/0118916 A1 | 6/2004 | He | ......... | 235/383 |
| 2004/0217774 A1 | 11/2004 | Choe | ......... | 326/30 |
| 2005/0212676 A1 | 9/2005 | Steinberg | ......... | 340/572.8 |
| 2006/0208859 A1 | 9/2006 | Hougen et al. | ......... | 340/10.1 |
| 2006/0208890 A1 * | 9/2006 | Ehrman et al. | ......... | 340/572.1 |
| 2007/0095911 A1 * | 5/2007 | Shimura et al. | ......... | 235/462.46 |

OTHER PUBLICATIONS

U.S. Appl. No. 11/084,072, filed Mar. 16, 2005 to Robert W. Hougen et al., entitled "System and Method for RFID Reader Operation."
Falcon® 4420 RFID user manual (Addendum) R44-2494 (Rev. X1) PSC Inc. no date.

(Continued)

*Primary Examiner*—John A. Tweel, Jr.
(74) *Attorney, Agent, or Firm*—Stoel Rives LLP

(57) ABSTRACT

A system and method for providing operational feedback of systems using electronic tags such as radio frequency identification (RFID) tags for inventory monitoring, including reference tags, that provide feedback to check if all inventory items have been identified. In one configuration, the RFID reader actuates by a single trigger pull, with the reader continuing to read multiple RFID tags in the read zone until a terminating event occurs.

30 Claims, 5 Drawing Sheets

OTHER PUBLICATIONS

Falcon® 5500 RFID Mobile Hybrid Computer user manual (Addendum) R44-2494 (Rev. X3) PSC Inc. no date.
Falcon® 5500 RFID Mobile Hybrid Computer user manual (Addendum) R44-2494 (Rev. X4) PSC Inc. no date.
Falcon® 5500 RFID Mobile Hybrid Computer user manual (Addendum) R44-2494 (Rev. A) PSC Inc. (about Aug. 2006).
Office Action dated Dec. 20, 2007 for U.S. Appl. No. 11/084,072 of Robert Hougen (application published as US2006/0208859).

* cited by examiner

© 2004 PSC Inc.

METHOD AND SYSTEM FOR INVENTORY MONITORING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever per 37 CFR § 1.71.

BACKGROUND

The field of the present disclosure relates to operating methods and techniques for systems employing electronic identification tags such as radio frequency identification (RFID) tags. In particular, methods and apparatus are described herein for improving and facilitating operation of electronic tag and RFID reading systems.

RFID interrogators use electromagnetic energy as a medium through which to send information. Typically, RFID tags are affixed to various articles for allowing identification of items in a sales transaction or tracking movement of the articles through a warehouse location. In a typical RFID tag system, the components forming the interrogator are a receiver, a transmitter, an antenna, a microprocessor and memory. Through the use of the interrogator, RFID tags are enabled to receive, store and transmit article-identifying data without manual handling operations. RFID tags may be read-only or read-write. Passive RFID tags may be implemented without an internal power source and draw their power from the radio frequency (RF) energy transmitted from the reader. Active RFID tags may include a power source such as a battery. RFID tags may be low or high frequency depending on the applications.

Existing RFID systems do not provide feedback to the user of an RFID reader to indicate whether or not the user completely covered an inventory area. The present inventors have recognized that it may be advantageous for a user to know what the RFID antenna coverage area is, so that the user may completely cover an inventory area. For applications with multiple inventory items such as in a warehouse, existing RFID systems provide no indication whether all swept RFID tags have been read.

The present inventors have recognized the desirability of providing methods and systems in the operation of RFID reading systems for improving operational efficiency and inventory monitoring performance.

SUMMARY

The preferred embodiment of the disclosure is a method of RFID reading comprising the steps of: 1) pointing a handheld RFID reader toward a read area containing item tags and reference tags; 2) actuating a trigger on the handheld RFID reader to commence reading RFID tags; 3) performing a first read operation, wherein the read operation comprises interrogating and sensing at least one RFID tag in the read area; 4) continuing with a subsequent read operation comprising interrogating and reading at least one tag in the read area; and 5) the RFID reader discontinuing subsequent read operations once a termination criteria is met.

These and other aspects of the disclosure will become apparent from the following description, the description being used to illustrate preferred embodiments when read in conjunction with the accompanying drawings.

DETAILED DESCRIPTION OF PREFERRED EMBODIMENTS

The preferred embodiments will now be described with reference to the drawings. While the preferred embodiments are described below with reference to an RFID tag, a practitioner in the art will recognize the principles described herein are viable to other applications.

Figure 1:
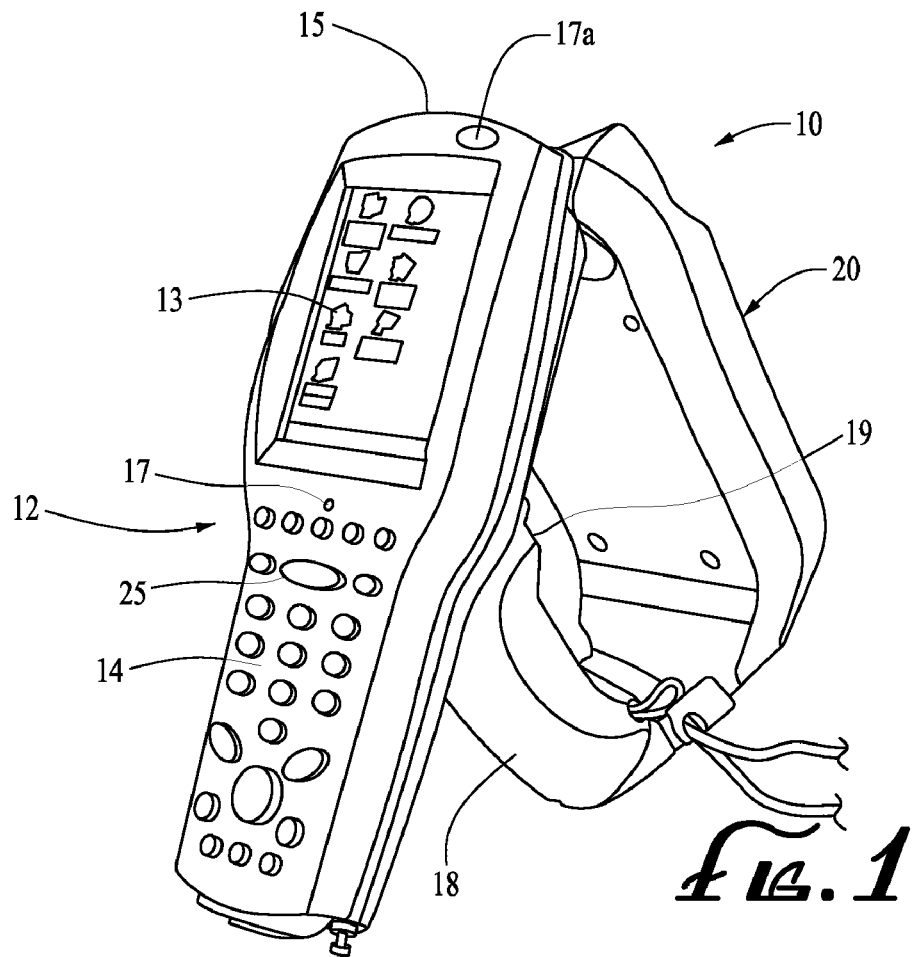
FIG. 1 is a diagrammatic view of a combined RFID system comprised of an RFID reader, optical code reader and data terminal according to a preferred embodiment.

FIG. 1 illustrates a handheld combination device 10 having a portable terminal section 12, a handle section 18 and an RFID antenna section 20. The portable terminal section 12 includes a display screen 13 and a keypad section 14 for providing control or data input into the terminal or displaying information to a user. The terminal 12 includes LED indicators 17 and 17a. The terminal 12 includes a front window 15 through which a data reading device, for example, an imaging reader or a laser scanner, may operate to read optical codes. The data reading device may detect an image within a field of view. The reader 10 may be a combination system with various functions controlled by the terminal 12 as the user selects input by using the touch display screen 13. Alternately, the user may input data through the keypad section 14. Within a particular mode of operation, the user may activate a particular read operation by actuating the pistol trigger 19 located on the front of the handle 18. The user may also activate a particular read operation by using a scan key trigger 25 on the keyboard 14 or another virtual switch on the touch screen 13.

The combination reader 10 sends out an interrogation signal during a read operation in response to an appropriate actuation, such as activating pistol trigger 19 or scan key trigger 25. Upon receipt of the interrogation signal, an RFID tag (whether it is a passive tag or an active tag), may respond by sending out a return signal containing the tag data. The combination reader 10 then senses the return signal and processes the signal to obtain the data.

An RFID read operation in a handheld device may be defined by actuation of a switch (e.g. trigger 19) and a single read command sent to the combination reader 10 to read all the tags within a radio frequency (RF) field. The combination reader 10 may read multiple tags within a single read operation or tag inventory operation. Each of the tags interrogated in a given read operation may be read sequentially according to a suitable protocol such as query response protocol or air interface protocol (AIP).

There are several difficulties in reading multiple tags located within a read volume. First, an RFID reader has a somewhat unclear read zone, meaning it is not intuitive to the user what area is being read. Secondly, unlike reading a bar code on an item where it is one bar code, one "beep" per item, an RFID reader is expected to read multiple RFID tags within the read volume and the user/system may not know how many tags are present. The present inventor has determined that all tags in a read volume are not always successfully read during a single read operation and the user may not know that the reader failed to detect some of the tags in the volume.

A first preferred embodiment is directed to a reading system monitors operator and equipment performance during repetitive read operations or inventories checking for a complete sweep of the reader's RF field across the volume to be read. For convenience, this reading system will be referred to as a sweep sentinel system. A sweep sentinel system comprises reference electronic tags, such as RFID tags, placed at suitable locations in the read volume to be interrogated. When a set of tags is interrogated, the combination reader 10 captures data from the reference tags in addition to the data from the tags located on inventoried goods. When all the reference tags are read, the inventory data is probably complete. If some reference tags are not read, the inventory data may be incomplete.

Figure 9:
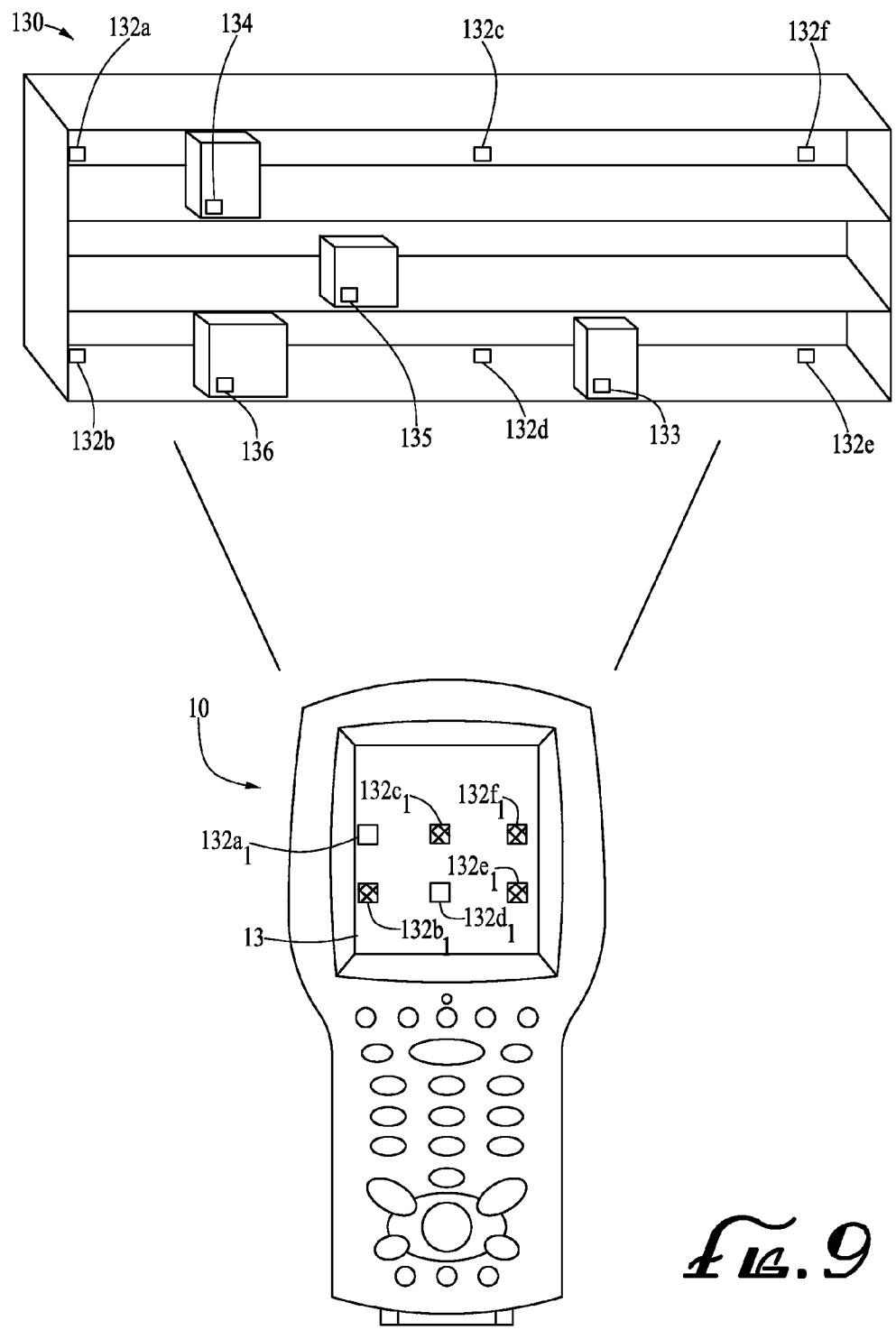
FIG. 9 is an illustration of a reference tag setup in a shelf environment and a data reader with a display of reference tags.

The reference tag data may be used in several ways. For example, a portable reader may be programmed with the relative locations of the various reference tags. When beginning an interrogation or an inventory sweep, a simple graphical representation of the reference tag locations may be displayed on the touch display screen 13 wherein the reference tags are automatically deleted (or changed color, for example from red to green) after the particular reference tag is read, thus indicating to the operator which portions of the volume remain to be swept. FIG. 9 illustrates such a system and is described in further detail below. Alternately, the reference tag data may be included in inventory data sent to terminal 12 for further processing such as data quality monitoring. The reference tag data may also be sent to the remote base station or other systems for further use. The other use may include checking for the complete coverage of different areas that may be scanned for tags.

In a second preferred embodiment, the RFID read operation is extended beyond a single read attempt by continuing to perform multiple reads or multiple interrogation sequences are undertaken until meeting a particular terminating criteria. One such method may be directed to a handheld reader including the steps of (1) pointing a handheld RFID reader toward a read area; (2) actuating a trigger on the handheld RFID reader to commence reading RFID tags by the substeps of (a) performing a first read operation, wherein the read operation comprises interrogating and sensing one or more RFID tags in the read area; (b) interrogating one or more reference tags in the read area; (c) continuing with a subsequent read operation comprising reading one or more tags in the read area; and (d) the RFID reader discontinuing subsequent read operations once meeting a termination criteria.

There are various mechanisms and methods for the termination criteria. For example, in one configuration, when activating the trigger 19, the user may hold the trigger 19 and the reading operation may continue as long as the user holds the trigger. In another configuration, the user may actuate the read operation by a first trigger pull and release with the read operation continuing until a subsequent (second) trigger pull that notifies the system to terminate.

There are various embodiments for software to make decisions. In one method the system may have knowledge that a discrete number of RFID tags, either inventory or reference, are expected in a particular read operation by using a counting mechanism. For example, when reading a pallet of items in a warehouse, the system might know that there are 50 RFID tags to be read wherein each tag identifies a particular inventory or pallet item. In addition, there may be several reference tags located among the inventory or pallet items. The reference tags provide a check to indicate that a complete sweep of the inventory area has been completed. Once each of the 50 RFID tags are read (as indicated/inferred by having read all of the reference tags), the operation may be terminated. The reference tag information assists the user with ensuring complete coverage of the volume to be read during the attempt to read all of the expected item tags. In a subset of this section, the pallet or inventory area may include its own RFID tag with the RFID tag providing information as to how many items are included on the pallet or in the inventory area. Alternately, the information may be stored in a look-up table accessible to the reader terminal.

There are other mechanisms to assist with selecting a read termination criterion. They include, but are not limited to, reading the expected number of reference tags, input field filling, an external controller, a termination delay timer, a new tag read timer and a minimum tag count. The RFID data being collected may be used to fill out certain input fields such as on an inventory check list. Once all the input fields on the inventory check list are filled the read operation may be terminated. The read operation may be monitored using a network and RFID read data may be reported to a host computer using the network. The RFID read data may then originate from the host computer using the network. The reader may have a delay in termination after releasing the trigger 19. In addition, the combination reader 10 may automatically continue to read and analyze whether new tags have been read. A timeout timer restarts each time a new tag and/or reference tag is detected. As long as a new tag is detected, it may be desirable to continue searching for and reading additional tags. According to a preferred termination criteria, if a new tag is not read within a specified time then the read operation is terminated. Alternately, termination criteria may include a minimum number of attempts to read tags during the inventory operation.

Each of the timeout times, shut-off delay or other system variables may be programmable variables. The programmable variables may be selected by the user, defaults in the system, selected by the host computer over the network or may be actively varied by the system. These variables may be selected by a given criteria as a result of a prior read operation or other inputs.

Figure 4:
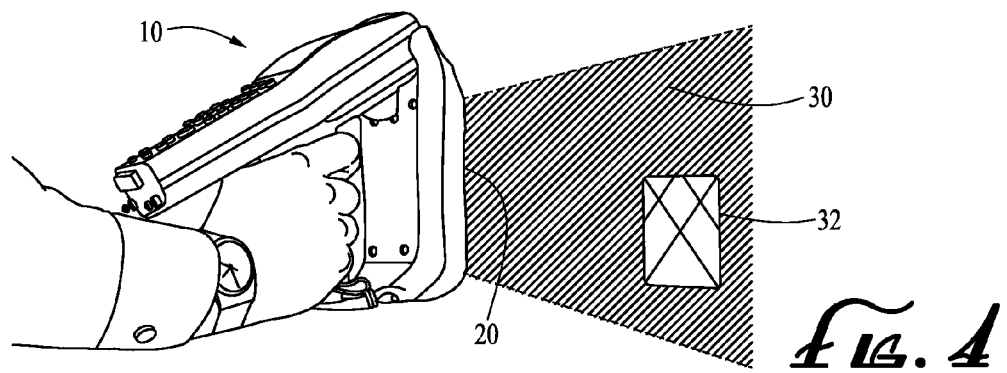
FIG. 4 is a diagram of an RFID system illustrating an RFID reading field relative to an RFID tag.

The sweep sentinel scheme allows the user to move the combination reader 10 in a single read operation to read all tags, including the reference tags, such as on a shelf. FIG. 4 illustrates a preferred orientation for aiming the combination reader 10 and an RFID tag 32 such that the RFID interrogator 20 points directly at the tag 32 providing a read field encompassing the tag. As illustrated in FIG. 9, the read field may include inventory RFID tags 133, 134, 135 and 136, and further include reference tags 132a, 132b, 132c, 132d, 132e and 132f spaced about a shelf area 130. The combination reader 10 may then sweep the shelf area 130 checking for a complete sweep using the reference tags. When the inventory is taken at the shelf area 130, the combination reader 10 captures data from the reference tags 132a, 132b, 132c, 132d, 132e and 132f in addition to the data from the tags 133, 134, 135 and 136 on goods that are being inventoried. If the reference tag data is present, the reader display 13 may indicate that all of the inventory data is complete with a single sweep. If some reference tags were not read, the user may attempt a second sweep of the shelf area 130. When beginning the inventory sweep by passing the combination reader 10 over the shelf area, a graphical representation $132a_1$, $132b_1$, $132c_1$, $132d_1$, $132e_1$, $132f_1$ of location may be shown on the display 13 of the reader. As each reference tag is read by the RFID interrogator 20, each reference tag may be automatically or manually deleted from the display 13. Alternately, an unread tag may be indicated by a first representation such as by a first color (e.g. red) or a clear box $132a_1$, $132d_1$ and the tags that have been read may be indicated by a second color (e.g. green) or by a blacked out or cross-hatched box $132b_1$, $132c_1$, $132e_1$, $132f_1$. Thus the display 13 notifies the user as to how many of the reference tags have been read as well as the location on the shelf where reference tag(s) have not been read allowing the user to re-sweep the shelf area or even a particular section of the shelf area.

By being able to move the combination reader 10 during the tag inventory operation, the user may relocate the direction of the antenna so as to better locate and read RFID tags 133, 134, 136 on items and reference tags 132a, 132b, 132c, 132d, 132e at different positions and orientations. For example, if the inventory items as illustrated in FIG. 9 contain metal, RFID tags located on an opposite side of the inventory item from the reader may be more difficult to read. The tags on the opposite side of items containing metal are more difficult to read or do not read at all because the metal interposed between the reader these tags tends to absorb the electromagnetic fields. By moving around to an opposite side or to the side of the inventory items containing metal, the user may reorient the reading of the RFID tag so that the RF signal need not pass through the metal. The shelf as illustrated in FIG. 9 may be too wide or there may be multiple shelves, preventing the reader from reading all of the inventory items on the shelf from a single position. The user may activate the combination reader 10, holding the trigger 19, and moving the reader in a sweeping motion along the shelf or each one of a plurality of shelves so as to read all the RFID tags and reference tags on the shelf.

Preferably the RFID tag data is reported as it is read and becomes available prior to the end of the overall read operation. In one embodiment, the reader responds with an audible beep tone each time a new RFID tag and/or reference tag is read and reported. The user may also be notified by actuation of an LED 17 such as by short flashing green each time a new tag is read and/or long flashing green each time a reference tag is read. The repetitive beeps and/or lighting of the LED indicator 17 provide information to the operator of the progress of the read operation. For example, when there are multiple tags intended to be read during the operation, a plurality of tags is read quickly at the beginning of the operation. As more and more tags and reference tags are read, fewer unread ("new") tags remain to be read wherein the frequency of the beeps indicating new tags being read slows down. Eventually the reader notifies the user that there are no further new tags to be read when a beep has not been heard within a reasonable time frame. The user may then terminate the operation by releasing the trigger 19. The trigger holding operation enables the user to move the read field such as by a painting motion, that is, sweeping a field systematically by moving the reader across a shelf of items to provide the combination reader 10 with the opportunity to read each of the items and reference tags from an optimal orientation.

In another termination criteria, software may be used to examine an intermediate report of tag data received and, following a given criteria, decide to terminate the read operation. One such criteria may comprise searching for a specific tagged item and capturing data of the inventoried goods in addition to data from the reference tags. If the reference tag data is present, the inventory data is deemed complete and the read operation is terminated. Moreover, the reference tag data may be used in several ways. For example, the combination reader 10 may be programmed to display a graphical representation of the reference tags location when beginning the inventory sweep. As the reference tags are identified, each identified reference tag is deleted after it is read until all the reference tags are read which then terminates the read operation.

Figure 2:
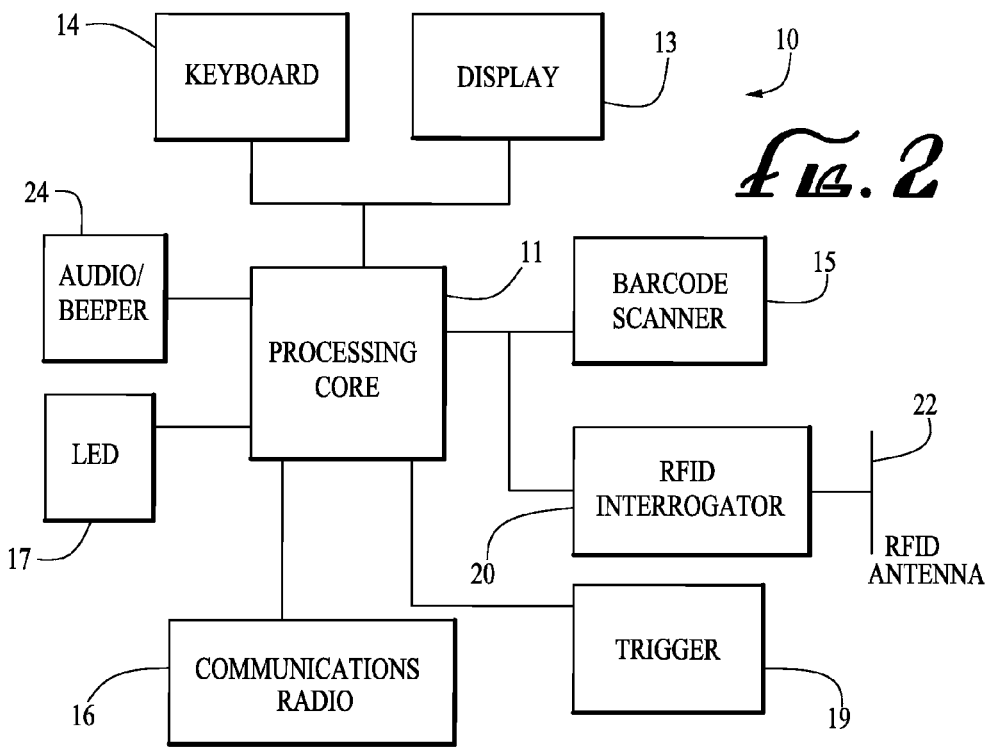
FIG. 2 is a simplified block diagram of an RFID system of FIG. 1.

FIG. 2 illustrates a schematic of the components of the combined reader 10 of FIG. 1. The combined reader includes a processing core 11 which may include the microprocessor within the terminal 12. Connected to the processor core 11 are the keyboard 14 that provides for information input and the display 13. The display 13 may display information and also act as a touch screen for inputting commands or data into the system. Under the control of the processing core 11 the system may include one or more indicators such as audio/beeper 24 or an indicator light 17. The indicator may comprise a light emitting diode (LED) or other suitable visible light indicator. Alternately, the indicator may be a separate high-intensity LED 17a on the top of the housing as shown in FIG. 1 or may be a suitable indicator appearing on the display 13.

The combination reader 10 is a multiple data input device having a barcode scanner or imaging reader 15, an RFID interrogator 20, a display 13, pistol trigger 19 and scan key trigger 25. The RFID antenna 22 is attached to the interrogator. The system communicates to a computer or another host via communications 16 which is preferably a wireless connection. The interrogator 20 communicates through the antenna 22 to read inventory RFID tags and reference tags. The display 13 provides a versatile and convenient control interface for the combination reader 10. In a preferred operation, the user may select which one of the reading mechanisms is to be used. In a preferred configuration, the combination reader 10 may have two triggers. There is the pistol trigger 19 on a handle 18 and the scan key trigger on the keyboard 14 of the terminal 12. Additional triggers may be provided on the keyboard 14 in the form of virtual key triggers displayed on the touch screen 13 or by electromechanical means (e.g., accelerometer switch). A user may activate a virtual key trigger to begin reading inventory RFID tags and reference tags, or independently read the reference tags. Each of the trigger functions may be set via software programming.

Figure 3:
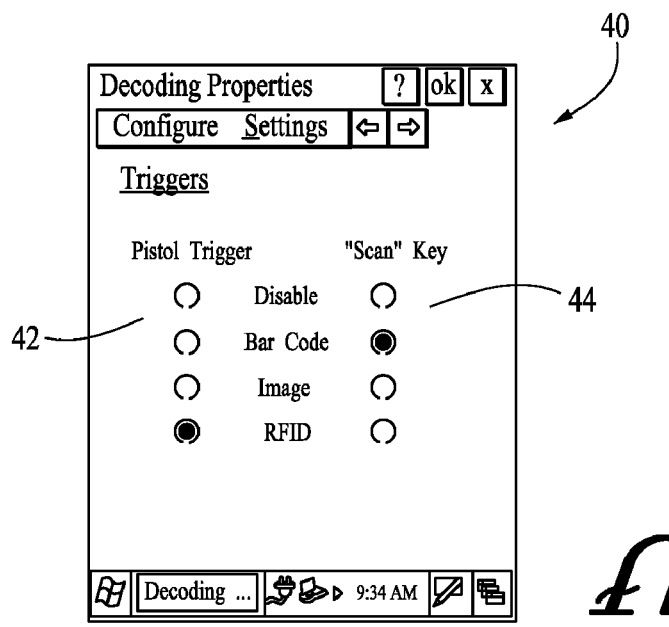
FIG. 3 is a screen view for an input scheme of a program for the system of FIG. 1.

In one operating method, the terminal functions in a Microsoft Windows™ environment. Once the combination reader 10 is powered on, onscreen instructions may be used to calibrate the touch screen 13. Accessing the configuration settings, a set of trigger options are accessed in the display 40 that is shown in FIG. 3. Using the display 40, the pistol trigger 19 may be enabled or disabled. The data reading device selected may be operable by the pistol trigger 19 in this configuration. For example, in the configuration of buttons 42 that are shown in FIG. 3, the RFID interrogator 20 may be selected to be actuated by the pistol trigger 19. The barcode scanner may be set to be actuated by the scan key 25 using the buttons 44. Alternately, when the combination reader 10 includes an imaging reader or imaging system the system may be activated by either the pistol trigger 19 or scan key trigger 25. The user may select either trigger by activating the onscreen selection process.

Once the combination reader 10 is enabled to read RFID tags and/or reference tags, an application may be opened on the terminal 12 that accepts data in a suitable format. For example, the terminal 12 may accept keyboard wedge data which is accepted by Microsoft Wordpad™ program. Once the program is activated, RFID tags may be read by the steps of: (1) aiming the combination reader 10 toward the RF field where inventory tags and reference tags are located; (2) pressing the trigger 19 wherein the front LED 17 turns orange indicating that the RFID interrogator 20 is in operation; (3) sounding an audible beep of differing pulses when the inventory tags and reference tags are read; (4) entering the RFID read into an application; and (5) when the read is finished the LED 17 is turned off and a final beep is sounded, indicating that the read operation is complete.

Figure 5:
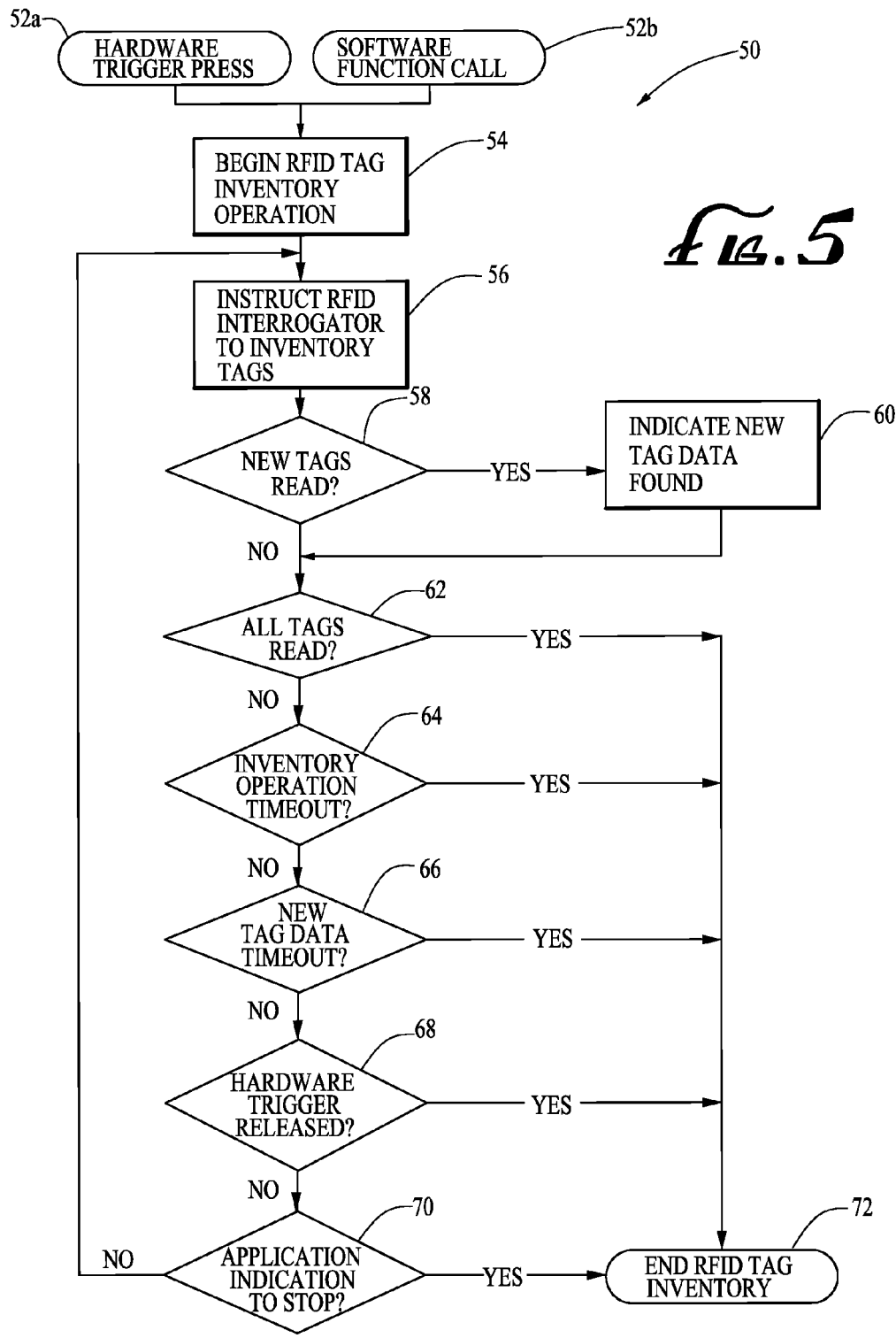
FIG. 5 is a flow chart of a method of RFID inventory monitoring according to a preferred embodiment.

FIG. 5 is a flow chart of a preferred method 50 as described in the following steps.

(1) The system may start either by a hardware trigger pull at step 52A or by a signal from an operating/software protocol at step 52B.

(2) The system may commence an RFID tag inventory operation at step 54;

(3) The RFID interrogator may be instructed to read the inventory tags and reference tags 56 wherein the interrogator emits a signal instructing the inventory tags and reference tags to transmit their data and whereby the interrogator then receives the signals from all the tags.

(4) Determining at step 58 whether any new tags have been read, whereby if "No" then continue scanning at step 62 and if "Yes" proceed to step 60, wherein at step 58 the combination reader 10 compares a tag read list to a list of inventory and reference tags previously read and only register a new read when the tag read has not been previously indicated during the current inventory sweep.

(5) Indicating a new tag has been read at step 60 wherein the indication may be actuating an audible tone at beeper 24 and/or actuating the LED 17 and/or LED 17a to provide a visual indicator.

(6) At step 62 read termination begins determining whether all the inventory and reference tags have been read by checking if a predetermined number of reference and/or inventory tags have been read.

(7) At step 64 read termination continues determining whether an operation timeout has occurred whereby the timeout time is started at step 54 or 56 and runs continuously as the inventory and reference tags are read, wherein the timeout time may be programmable and set to a value depending on the combination reader 10 requirements or may be a variable adjusted reader depending upon certain read criteria such as average RFID signal strength detected.

(8) At step 66 read termination continues determining whether a new tag timeout has occurred whereby the timer is re-started at step 60 each time a new inventory and reference tag is detected as being read, wherein as long as new tags are being read, it is desired to permit the combination reader 10 to continue reading tags, and wherein the timeout may be programmable and set to a value depending upon the reader requirements or may be variable adjusted by the reader depending upon certain read criteria such as average RFID signal strength.

(9) At step 68 read termination continues determining if the trigger has been released.

(10) At Step 70 if no read termination has been indicated then returning to Step 56 and continue tag inventory.

(11) At Step 72 if a read termination has been indicated ending the RFID tag inventory.

The method of FIG. 5 includes multiple termination events or Steps 62, 64, 66, 68 and 70. The order of these events may be re-arranged, or one or more of the events may be omitted depending on the application. Which of these termination steps or the combination of steps is applied may be user-selected with a suitable program interface. For example, the combination reader 10 may terminate the read only via release of the trigger at Step 68 with the Steps 62, 64, 66 and/or 70 omitted.

Figure 6:
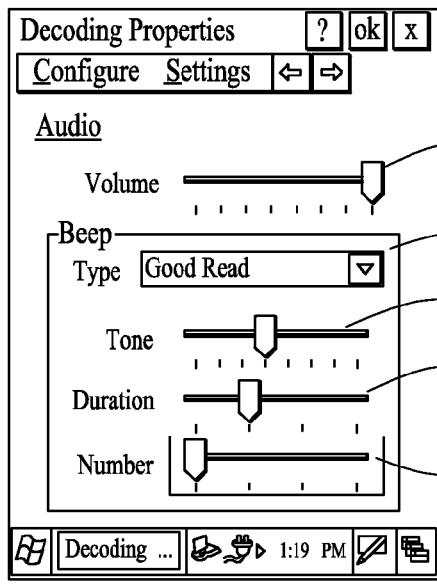
FIG. 6 is a screen shot for an input scheme of an audio portion for the system of FIG. 1.

FIG. 6 illustrates a screen shot 100 of display 13 using an input scheme for selecting the audio indicators. A volume slide button 102 enables the user to select a "beep" volume from zero to maximum. There are several audible indicators in the combination reader 10 wherein each of the indicators are adjustable being selected by the drop-down menu 104. A "Good Read" type is shown in FIG. 6. Other indicators may include "All Tags Read" type as from Step 62 in FIG. 5. Once the type 104 is selected, the tone may be adjusted/selected by slide button 106. The beep duration may be selected by slide button 107 and the number of beeps may be selected by slide button 108. For example, a triple beep may be sounded to indicate that all tags have been read.

Figure 7:
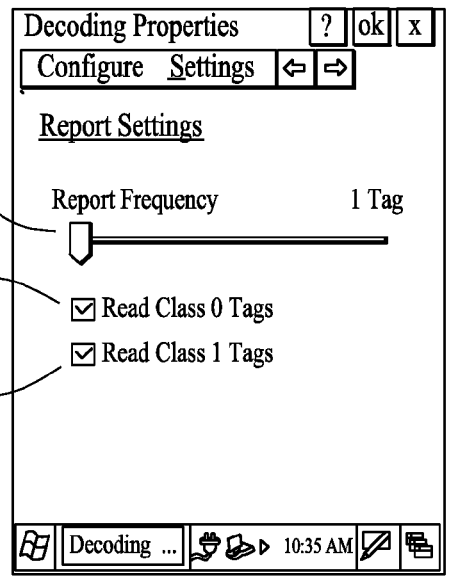
FIG. 7 is a screen shot for an input scheme of report settings for the system of FIG. 1.

FIG. 7 illustrates a screen shot 110 of display 13 showing an input scheme for report settings. A slide button 112 selects how often RFID tag data is reported to an application. When set to a specific number of tags, data is reported when at least the selected number of new tags has been read. When set to the minimum, that is one tag, each time a new tag is read it is reported after being read. When set to infinite, data is only reported when a reading operation is complete, such as when all the reference tags have been read. Selecting the checkbox 114 for inventory tags which may be a read class 0 tags, and/or checkbox 116 for reference tags which may be a read class 1 tags, selectively enables or disables the device to read each class of RFID tags. The reader may be configured to recognize only item tags, to recognize only reference tags, or to recognize both item and reference tags. Improved performance may be achieved by enabling only the tags which will be used. For example, tag selection may facilitate special operations such as checking that the reference tags are in place.

Figure 8:
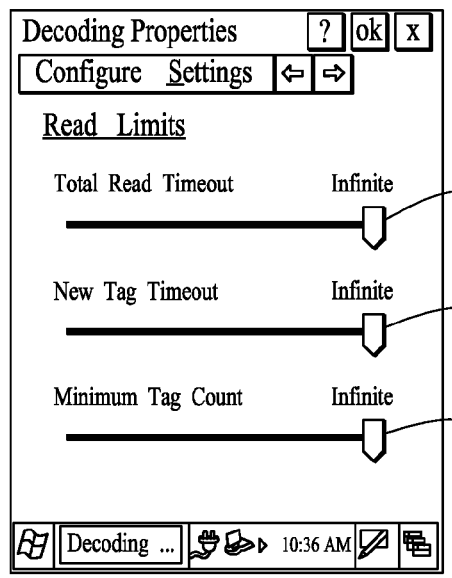
FIG. 8 is a screen shot for an input scheme of read limits for the system of FIG. 1.

FIG. 8 illustrates a screen shot 120 of display 13 selecting an input scheme for differing read limit values including a total read timeout 122, a new tag timeout 124 and a minimum tag count 126. The total read timeout 122 is the time for which the combination reader 10 will be allowed to read before terminating the operation. This value corresponds to step 64 in FIG. 5. If set to infinite, then the reading/searching for new tags will continue until the trigger is released, the new tag timeout occurs or the minimum number of tags has been read. The new tag timeout 124 is the amount of time to wait between new tag reads before the inventory operation is terminated. The new tag timeout value corresponds to step 66 in FIG. 5. The new tag timeout value is the maximum amount of time spent waiting for a new tag to be read after the last new tag that had previously been read. The minimum tag count 126 is the minimum number of tags to attempt to read. If set to infinite, the reading/searching for new tags will continue until the trigger is released or one of the timeout conditions are met.

To improve operability during an inventory reading process, additional feedback may be provided to the operator. Audible indicators such as a "beep" tone at a given pitch may signal the successful read of an RFID tag. In a preferred embodiment, a signal may be sounded only when a new tag is read. Once all the tags are determined to have been read, then an alternate signal may be sounded. For example, the alternate signal may be a plurality of differing pitched sounds, a multiple tone, a beep, a long tone, a short tone, and/or a combination of beeps, tones and pitched sounds, to provide a signal to the user that the reading operation is complete.

The display 13 may provide a plurality of feedback schemes during the inventory reading process including: (1) a quantity of tags read during the operation wherein various formats of the display may be implemented such as a simple increasing number in the form of a numerical representation (e.g. 1, 2, 3 . . . 50) or a bar graph with either a single or multiple bars; (2) a countdown of the number of inventory items read wherein the expected number of items to be read within an inventory read operation is known or obtained, and then the display screen 13 shows the beginning number of items expected counting down toward zero (e.g. 50, 49, 48 . . . 2, 1, 0); and/or (3) a display of the amount of operation time remaining wherein the display may shown a numerical countdown toward zero (e.g. 10, 9, 8 . . . 2, 1, 0), or a graphical representation using bars or the like with decreasing amounts as the remaining time decreases.

The sweep sentinel system using reference tags is also applicable to fixed reader systems. In one system, boxes of items are arranged on pallets in a warehouse. Each box has an RFID tag identifying the box and its contents. Multiple boxes are arranged on a pallet. It is desirable to read each of the RFID tags as the pallet is moved. Reference tags are arranged on the pallet, for example, a reference tag on each corner and at the center. So as the pallet is lifted by the forklift or passed through the RFID read zone of the passageway, the reader may read both the reference tags and the item tags. Depending upon whether all or some of the reference tags are tags are read provides an inference as to whether all the item tags have been read.

While there has been illustrated and described a disclosure with reference to certain embodiments, it will be appreciated that numerous changes and modifications are likely to occur to those skilled in the art. It is intended in the appended claims to cover all those changes and modifications that fall within the spirit and scope of this disclosure and should, therefore, be determined only by the following claims and their equivalents.

What is claimed is:

1. A method of RFID reading comprising the steps of:
pointing a handheld RFID reader toward a read area containing RFID tags including both item tags and reference tags, wherein an item tag is disposed on an item and includes identification data corresponding to that item, wherein a reference tag is positioned at a location in the read area such that when read by the RFID reader signifies that the RFID reader has effectively read a region proximate that location of the read area;
actuating a trigger on said handheld RFID reader to commence reading the RFID tags;
performing a first read operation comprising interrogating and sensing with said RFID reader at least one RFID tag in said read area.

2. A method according to claim 1 further comprising
continuing with a subsequent read operation comprising interrogating and reading at least one tag in said read area, said RFID reader discontinuing subsequent read operation once a termination criteria is met.

3. A method according to claim 2 further comprising repeating subsequent read operation as long said trigger is held, wherein said termination criteria is met by reading a plurality of said reference tags.

4. A method according to claim 2 wherein said termination criteria is met once said RFID reader captures an expected number at unique item tags.

5. A method according to claim 2 wherein said termination criteria is met by counting a total number of distinct reference tags during a read operation and discontinuing subsequent read operation if said total number reaches a given value.

6. A method according to claim 2 further comprising filling input fields on an inventory checklist with data acquired from the item tags, wherein said termination criteria is met by completion of filling of the input fields.

7. A method according to claim 2 wherein said termination criteria is met by obtaining data from said reference tags and data from said item tags and verifying complete inventory data.

8. A method according to claim 2 wherein said termination criteria is met by detecting the release of said trigger.

9. A method according to claim 2 wherein said termination criteria is met by detecting a maximum elapsed time since said trigger was activated.

10. A method according to claim 2 wherein said termination criteria is met by detecting a maximum elapsed time since the most recent read of an RFID tag.

11. A method of electronic tag reading comprising the steps of:
passing a handheld electronic tag reader past a read volume, said read volume containing multiple electronic tags including at least one item tag and at least one reference tag, wherein an item tag is disposed on an item and includes identification data corresponding to that item, wherein a reference tag is positioned at a predetermined location in said read volume rather than disposed on an item such that when read by the electronic tag reader signifies that the electronic reader has effectively read a region proximate that location of the read volume;
activating said reader;
reading at least one of said electronic tags; and
notifying a user of said reading by an indication signal representing that said electronic tags have been read.

12. A method according to claim 11 wherein said indication signal is a graphical display of locations of reference tags that have been read.

13. A method according to claim 11 wherein a single reader activation comprises a plurality of read operations, wherein a read operation comprises interrogating and sensing at least one electronic tag in said read volume.

14. A method according to claim 11 wherein said indication signal is an audible tone indicating the reading of said electronic and reference tags.

15. A system for reading a plurality of electronic tags disposed in a read area, comprising:
a) an electronic tag reader for reading electronic tags;
b) a plurality of electronic tags including item tags and at least one reference tag disposed in the read area, wherein an item tag is disposed on an item and includes identification data corresponding to that item, wherein a reference tag is positioned at a specific location in the read area such that when read by the electronic tag reader signifies that the electronic tag reader has effectively read a region proximate that specific location of the read area;
c) means for actuating said electronic tag reader to commence reading said electronic tags;
d) wherein said electronic tag reader is operative (i) to perform a first read operation, wherein said first read operation comprises interrogating and sensing the at least one reference tag and one or more item tags in said read area.

16. A system according to claim 15 wherein the electronic tag reader is further operative (ii) to continue with a subsequent read operation comprising interrogating and reading at least one or more electronic tags in said read area, and (iii) to discontinue subsequent read operations once a termination criteria is met.

17. A system according to claim 16 wherein said termination criteria is met by counting a total number of distinct reference tags during a read operation and discontinuing subsequent read operation if said total number reaches a given value.

18. A system according to claim 16 wherein said termination criteria is met by completing input of field inventory data.

19. A system according to claim 16 wherein said termination criteria is met by obtaining data from the reference tag(s) and data from said item tags and verifying complete inventory data.

20. A system according to claim 16 wherein said means for actuating comprises a switch on said electronic data reader and said termination criteria is met by detecting release of said switch.

21. A system according to claim 16 wherein said termination criteria is met by detecting a maximum elapsed time since said switch was activated.

22. A method according to claim 11 wherein said indication signal is a graphical display of locations of reference tags that have not been read.

23. A method of electronic tag reading comprising the steps of
arranging a plurality of reference tags at specific locations about a read area;
using an electronic tag reader to read electronic tags including both item tags and reference tags disposed in the read area, wherein an item tag is disposed on an item and includes identification data corresponding to that item, wherein a reference tag is positioned at a specific location in the read area such that a successful read by the electronic tag reader of that reference tag signifies that the electronic tag reader has effectively read a region proximate that specific location of the read area.

24. A method according to claim 23 further comprising confirming that the electronic tag reader has successfully covered the read area by determining that the electronic tag reader has read a given number of the reference tags.

25. A method according to claim 23 further comprising providing a display on the electronic tag reader with a graphical representation of locations of reference tags that have not been read.

26. A method according to claim 25 further comprising once a reference tag has been read, removing the graphical representation corresponding to that reference tag from the display.

27. A method according to claim 25 further comprising once a reference tag has been read, changing the graphical representation corresponding to that reference tag to indicate that tag has been read.

28. An inventory monitoring system comprising
a read area within which a plurality of items are disposed, each item bearing electronic item tag readable by an electronic tag reader;
a plurality of electronic reference tags disposed at predetermined locations spaced about the read area such that a reference tag being read by the electronic tag reader signifies that the electronic tag reader has effectively read that specific location of the read area associated with that reference tag;
scanning the electronic tag reader over the read area to read both item tags and reference tags and determining that the read area has been effectively scanned once each of the reference tags has been read.

29. A method of inventory monitoring in which a given number of items are disposed on a pallet, each item bearing an electronic item tag containing identification information corresponding to the item, the method comprising the steps of
providing the pallet with at least one electronic reference tag, the reference tag containing information relating to the pallet;
determining the given number of items on the pallet by using an electronic tag reader to obtain the information from the reference tag,
using the electronic tag reader to read the item tags on the items and discontinuing reading once the given number of items have been read.

30. A method according to claim 29 wherein the information contained by the reference tag includes the number of items on the pallet.

* * * * *

UNITED STATES PATENT AND TRADEMARK OFFICE
CERTIFICATE OF CORRECTION

PATENT NO.        : 7,394,358 B2                                    Page 1 of 1
APPLICATION NO. : 11/230365
DATED             : July 1, 2008
INVENTOR(S)       : Craig D. Cherry It is certified that error appears in the above-identified patent and that said Letters Patent is hereby corrected as shown below:

<u>Column 1</u>
Line 9, after "of" insert --each tag--.

<u>Column 10</u>
Line 49, before "unique", change "at" to --of--.

Signed and Sealed this

Twenty-third Day of September, 2008

JON W. DUDAS
*Director of the United States Patent and Trademark Office*